US008862075B2

(12) United States Patent
Allpress et al.

(10) Patent No.: US 8,862,075 B2
(45) Date of Patent: Oct. 14, 2014

(54) ADAPTIVE TRANSMISSION FEEDBACK

(75) Inventors: Steve Allpress, Bristol (GB); Abdelkader Medles, Bristol (GB)

(73) Assignee: Icera Inc., Wilmington, DE (US)

( * ) Notice: Subject to any disclaimer, the term of this patent is extended or adjusted under 35 U.S.C. 154(b) by 95 days.

(21) Appl. No.: 13/384,793

(22) PCT Filed: Mar. 26, 2010

(86) PCT No.: PCT/EP2010/053994
§ 371 (c)(1),
(2), (4) Date: Jan. 19, 2012

(87) PCT Pub. No.: WO2011/009647
PCT Pub. Date: Jan. 27, 2011

(65) Prior Publication Data
US 2012/0122407 A1    May 17, 2012

(30) Foreign Application Priority Data
Jul. 20, 2009   (GB) .................................. 0912581.6

(51) Int. Cl.
*H04B 7/02*    (2006.01)
*H04B 7/06*    (2006.01)
*H04B 17/00*   (2006.01)

(52) U.S. Cl.
CPC ............ *H04B 7/0623* (2013.01); *H04B 7/0632* (2013.01); *H04B 17/0075* (2013.01); *H04B 7/066* (2013.01)
USPC .............................. 455/101; 455/69; 375/299

(58) Field of Classification Search
CPC ............................. H04B 7/022; H04B 7/0417
USPC .............................. 455/101, 69; 375/267, 299
See application file for complete search history.

(56) References Cited

U.S. PATENT DOCUMENTS

| | | | |
|---|---|---|---|
| 6,385,437 B1 * | 5/2002 | Park et al. ........................ | 455/69 |
| 7,907,911 B2 * | 3/2011 | Alexiou et al. ................. | 455/69 |
| 2002/0098872 A1 | 7/2002 | Judson | |
| 2003/0002594 A1 | 1/2003 | Harel et al. | |
| 2005/0036441 A1 * | 2/2005 | Laroia et al. .................. | 370/203 |
| 2005/0143112 A1 * | 6/2005 | Jonsson ........................ | 455/522 |

(Continued)

FOREIGN PATENT DOCUMENTS

| | | |
|---|---|---|
| GB | 2353437 A | 2/2011 |
| WO | 2005060122 A1 | 6/2005 |

(Continued)

OTHER PUBLICATIONS

"LTE; Evolved Universal Terrestrail Radio Access (E-UTRA); Physical Channels and Modulation," 3GPP TS 36.211 version 8.6.0 Release 8, ETSI TS 136 211 v8.6.0, Apr. 2009, pp. 88 and title page.

(Continued)

*Primary Examiner* — Creighton Smith

(57) ABSTRACT

A method, program and apparatus for transmitting from a transmitter to a receiver over a channel using a transmit diversity scheme. The method comprises: receiving power-related information fed back from the receiver to the transmitter; and at the transmitter, using the power-related information to generate channel state information. The method further comprises using the generated channel state information to control for subsequent transmission to the receiver from the multiple transmit antennas of the transmitter.

38 Claims, 7 Drawing Sheets

(56) References Cited

U.S. PATENT DOCUMENTS

| | | |
|---|---|---|
| 2006/0135079 A1 | 6/2006 | Barnett et al. |
| 2007/0041457 A1* | 2/2007 | Kadous et al. ............... 375/260 |
| 2007/0071127 A1* | 3/2007 | Gore et al. .................. 375/267 |
| 2007/0110137 A1* | 5/2007 | Guess et al. ................. 375/148 |
| 2008/0081565 A1 | 4/2008 | Kim |
| 2008/0123768 A1 | 5/2008 | Harel et al. |
| 2008/0240260 A1 | 10/2008 | Heidari et al. |
| 2009/0080504 A1 | 3/2009 | Li et al. |
| 2009/0102715 A1 | 4/2009 | Lou et al. |
| 2010/0215082 A1* | 8/2010 | Guess et al. ................. 375/147 |
| 2010/0304666 A1* | 12/2010 | Hottinen et al. ................ 455/7 |
| 2011/0211662 A1* | 9/2011 | Varadarajan et al. ......... 375/346 |
| 2011/0261898 A1* | 10/2011 | Huang et al. ................ 375/295 |
| 2012/0140838 A1* | 6/2012 | Kadous et al. ............... 375/267 |
| 2013/0294224 A1* | 11/2013 | Antonio et al. ............... 370/216 |

FOREIGN PATENT DOCUMENTS

| | | |
|---|---|---|
| WO | 2006/127318 A1 | 11/2006 |
| WO | 2006127390 A1 | 11/2006 |
| WO | 2007055972 A2 | 5/2007 |
| WO | 2008113022 A1 | 9/2008 |
| WO | 2008113025 A1 | 9/2008 |
| WO | 2011009647 A1 | 1/2011 |

OTHER PUBLICATIONS

"Universal Mobile Telecommunications System (UMTS); Physical Channels and Mapping of Transport Channels Onto Physical Channels (FDD)," 3GPP TS 25.211 version 4.6.0 Release 4, ETSI TS 125 211 v4.6.0, Sep. 2002, pp. 47 and title page.

"Universal Mobile Telecommunications System (UMTS); Physical Layer Procedures (FDD)," 3GPP TS 25.214 version 8.4.0 Release 8, ETSI TS 125 214 v8.4.0, Jan. 2009, pp. 93 and title page.

Foreign Communication From a Related Counterpart Application, German Application No. 112010002986.5, German Office Action dated Sep. 6, 2013, 10 pages.

Foreign Communication From a Related Counterpart Application, German Application No. GB0912581.6, German Search Report dated Oct. 29, 2010, 3 pages.

* cited by examiner

ADAPTIVE TRANSMISSION FEEDBACK

CROSS-REFERENCE TO RELATED APPLICATION

This application is the National Stage of, and therefore claims the benefit of, International Application No. PCT/EP2010/053994 filed on Mar. 26, 2010, entitled "ADAPTIVE TRANSMISSION FEEDBACK," which was published in English under International Publication Number WO 2011/009647 on Jan. 27, 2011, and has a priority date of Jul. 20, 2009, based on application GB 0912581.6. Both of the above applications are commonly assigned with this National Stage application and are incorporated herein by reference in their entirety.

FIELD OF THE INVENTION

The present invention relates to an adaptive transmission scheme for use with a transmitter having multiple transmit antennas.

BACKGROUND

The use of multiple antennas at the transmitter promises to deliver important performance improvements in terms of saving power, improving link quality, and increasing capacity of wireless systems in general. For these reasons Downlink Transmit Diversity mode has been included in the initial version of the WCMDA 3GPP standard in Release 99 [3GPP TS 25.211, "Physical channels and mapping of transport channels onto physical channels (FDD)", September 2002, Section 5.3.1]; and in Release 7 the MIMO (Multiple-Input-Multiple-Output) mode, which uses multiple antennas at both the User Equipment (UE) and at the Base Station (BS), has been adopted [3GPP TS 25.214, "Physical layer procedures (FDD)", December 2008, Section 9]. More recently the Long Term Evolution (LTE) or Release 8 of 3GPP standard has also adopted multiple transmit antennas techniques to boost performance [3GPP TS 36.211, "Physical channels and modulation", March 2009].

Two main categories of multiple transmit antenna techniques can be distinguished: (i) multiple transmit antenna techniques without use of channel state information (CSI), and (ii) multiple transmit antenna techniques with the use of CSI.

(i) Multiple transmit antennas techniques that do not use the CSI are non-adaptive (see FIG. 1). Among this family of techniques are the Space-Time Codes and particularly the well know Alamouti scheme used for the two transmit antenna case where the space-time coding aims at capturing the diversity of the antennas in order to reduce the likelihood of the channel being in deep fade.

(ii) Multiple transmit antenna techniques that do use the CSI are adaptive (see FIG. 2). The adaptation comprises adjusting the relative phase and/or amplitude of a signal as transmitted from the different transmit antennas. A good example is the popular beamforming whereby the multi-antenna transmission is steered in space in a way to achieve maximum received power.

Naturally, adaptive techniques which use CSI achieve better performance gains than those that are agnostic to the CSI; but on the other hand non-adaptive techniques show more robustness especially in environments where the CSI is partial or inaccurate, for example in the case of high speed channels.

Recently hybrid approaches like long-term precoding have been proposed. Those techniques try to combine non-adaptive coding methods with the use of partial CSI like the long-term correlation of transmit antennas to achieve a compromise between the performance of adaptive techniques and the robustness of the non-adaptive ones.

Current adaptive techniques require the availability of CSI. Some methods have been proposed that exploit the channel reciprocity (between the transmit link and receive link) to provide CSI to the transmitter, but those techniques are only applicable when Time Division Duplex (TDD) is used and even in this case a challenging calibration is required between the transmit and receive links. It remains that in most of the existing Frequency Division Duplex (FDD) standards availability of the CSI at the transmitter is only achieved by feedback from the receiver through the reverse link.

The feedback of the CSI from the receiver to the transmitter results in a significant overhead on the reverse link, and this is especially true for cellular systems where the number of users can be significant and therefore the feedback has to be performed for all the users, which greatly reduces the system capacity. Additionally, the introduction of the feedback by itself leads to an increased complexity of the system.

By way of example, consider the problem of two transmit (Tx) antennas and one receive (Rx) antenna, in which the phase at the second transmit antenna is adapted to achieve the highest receive power.

The commonly held point view is that, for the adaptation to work, then CSI in the form of the optimal phase between the two antennas has to be fed back from the receiver to the transmitter on the reverse link (see FIG. 3). This not only means that a specific feedback mechanism needs to be designed and included in the reverse link, but also that the receiver must have the capability to estimate the channel coming from each antenna (which requires a different pilot sequence per antenna). This makes the introduction of such a scheme complicated, and furthermore increases the signalling overhead.

SUMMARY

It would be desirable to be able to achieve some or all of the performance benefits of adaptive multiple antenna transmission but without the need for a complex new mechanism to feed back the channel state information from receiver to transmitter, which would require substantial changes to existing standards. Alternatively or additionally, it would also be desirable to achieve the benefits of adaptive multiple antenna transmission without incurring the signalling overhead required to feed back the channel state information.

Advantageously therefore, the present invention uses other existing feedback information in order to generate information about the diversity of the channel locally at the transmitter.

According to one aspect of the present invention, there is provided a method of transmitting from a transmitter to a receiver over a channel using a transmit diversity scheme whereby the same data is transmitted from multiple transmit antennas of the transmitter with different relative weightings, the method comprising: for each of a plurality of time intervals, receiving power-related information fed back from the receiver to the transmitter, relating to a combined power from the multiple antennas as received at the receiver over said channel; at the transmitter, applying a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; and using the generated channel state information to control the relative weightings for subsequent transmission to the receiver from the multiple transmit antennas of the transmitter.

For example, by exploiting the received signal to interference-plus-noise (SNR) or other power related feedbacks which often already do exist in legacy systems, then channel state information can be extracted in order to be used in multi-antenna transmit adaptation. E.g. power control commands like the Transmit Power Control (TPC) used in the 3GPP standard, or SNR related feedbacks like the Channel Quality Index (CQI), can be used to generate the channel state information.

In embodiments, the application of said filter may comprise applying a Kalman filter algorithm.

Said generation may be performed without receiving explicit channel state information fed back from the receiver indicating the receiver's preferred weightings, by instead using said power-related information to generate said channel state information at the transmitter.

The power-related information may be fed back for a primary purpose other than transmit diversity, and the method may comprise using the power-related information to control a function of the transmitter relating to said primary purpose.

Said primary purpose may comprise at least one of: controlling the combined power of the channel, and adaptive modulation.

The power-related information may comprise a measure of received signal power relative to disturbance. Said measure may comprise a ratio of signal power to interference-plus-noise. Said measure may comprises a channel quality indicator. Said measure may comprises at least one of an SNR and a CQI of a 3GPP standard.

The power-related information may comprise a power control command. The power control command may comprise a TPC command of a 3GPP standard.

Said refinement of the estimated channel state information for the current time interval may be performed using a measurement based on: the power control command for the current time interval, and a step value by which the combined power from the transmitter is raised or lowered in response to a power control command.

The power-related information may comprise an acknowledgment message or non-acknowledgment message relating to previous transmitted data.

The method may comprise applying a different degree of relative bias to one of the acknowledgment and non-acknowledgement before use in said recursive filter.

The method may comprise dynamically adjusting said degree of relative bias to maximise a long term performance metric. The long-term performance metric may comprise at least one of average power saving or average link capacity.

The different relative weightings may define at least different relative phases, and said use of the generated channel state information to control the relative weightings may comprise controlling the relative phases.

The different relative weightings may define different amplitudes, and said use of the generated channel state information to control the relative weightings may comprise controlling the relative amplitudes.

The method may further comprise using the power-related information to determine a reliability measure for the generated channel state information, and also using the reliability measure to control the weightings for the subsequent transmission to the receiver from the multiple transmit antennas of the transmitter.

Said use of the channel state information to control the weightings may comprise updating said weightings at a rate of once per period, wherein said period spans a plurality of said time intervals, and said refinement may be performed by combining the power-related information received over some or all of the time intervals spanned by said period.

The method may comprise dynamically adjusting said period in order to maximise a long term performance metric. The long-term performance metric may comprise at least one of average power saving or average link capacity.

The method may comprise regularising said weightings so as to ensure at least a minimum degree of diversity of directions in transmission to the receiver.

In further embodiments, the method may comprise operating the transmitter in at least two different modes of operation at different times: a first mode of operation in which the same data is transmitted from multiple transmit antennas of the transmitter with different relative weightings; and a second mode of operation in which data is transmitted from only a selected one or more of the multiple transmit antennas, by applying a non-zero weighting to only the selected one or more transmit antennas; wherein in both modes, the weightings are controlled using the generated channel state information.

In the second mode of operation, the data may be transmitted from only a selected one of the multiple transmit antennas.

Said refinement of the estimated channel state information for the current time interval may be performed using a combined measurement based on the power-elated information over a period spanning multiple time intervals. The combined measurement may comprise an average measurement based on the power-related information for the multiple time intervals.

According to another aspect of the present invention, there is provided a transmitter comprising: multiple transmit antennas; transmission circuitry coupled to the multiple transmit antennas, arranged to transmit to a receiver over a channel using a transmit diversity scheme whereby the same data is transmitted from the multiple transmit antennas with different relative weightings; reception circuitry arranged to receive, for each of a plurality of time intervals, power-related information fed back from the receiver to the transmitter, relating to a combined power from the multiple antennas as received at the receiver over said channel; and signal processing apparatus coupled to the transmission and reception circuitry, and configured to apply a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; wherein the signal processing apparatus is configured to use the generated channel state information to control the relative weightings for subsequent transmission to the receiver from the multiple transmit antennas of the transmitter.

The signal processing apparatus preferably comprises a memory storing signal processing software, and a processor coupled to the memory and arranged to execute the signal processing software.

The signal processing apparatus may be further configured in accordance with any of the methods described herein.

According to a further aspect of the present invention, there is provided a program product for transmitting from a transmitter to a receiver over a channel using a transmit diversity scheme whereby the same data is transmitted from multiple transmit antennas of the transmitter with different relative weightings, the program product comprising code embodied on a computer-readable medium and configured so as when executed on a processor to: for each of a plurality of time intervals, receive power-related information fed back from the receiver to the transmitter, relating to a combined power from the multiple antennas as received at the receiver over said channel; at the transmitter, apply a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; and use the generated channel state information to control the relative weightings for subsequent transmission to the receiver from the multiple transmit antennas of the transmitter.

The code may be further configured to perform any of the method steps described herein.

According to a further aspect of the invention, there is provided a method of transmitting from a transmitter to a receiver over a channel using a transmit diversity scheme whereby data can be transmitted from a selected one or more of multiple transmit antennas of the transmitter, the method comprising: at the transmitter, receiving power-related information fed back from the receiver, relating to a power from the one or more selected transmit antennas as received at the receiver over said channel; at the transmitter, using said power-related information to generate channel-related information relating to the transmit-diversity scheme; and using the generated channel-related information to select only one or more of the multiple transmit antennas to use for subsequent transmission to the receiver.

In embodiments, data may be transmitted from only a selected one of the multiple transmit antennas at any one time.

The method may further comprise: for each of a plurality of time intervals, receiving power-related information fed back from the receiver to the transmitter, relating to a power from the one or more selected transmit antennas as received at the receiver over said channel; at the transmitter, applying a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; and using the generated channel-related information to select which of the multiple transmit antennas to use for subsequent transmission to the receiver.

Said power-related information may comprise a power control command.

Said refinement of the estimated channel state information for the current time interval may be performed using a measurement based on: the power control command for the current time interval, and a step value by which the power from the one or more selected transmit antennas is raised or lowered in response to a power control command.

Said refinement of the estimated channel state information for the current time interval may be performed using a combined measurement based on the power-related information over a period spanning multiple time intervals. Said combined measurement may comprise an average measurement based on the power-related information for the multiple time intervals.

According to a further aspect of the present invention, there may be provided a transmitter comprising: multiple transmit antennas; transmission circuitry coupled to the multiple transmit antennas, arranged to transmit to a receiver over a channel using a transmit diversity scheme whereby data can be transmitted from a selected one or more of the multiple transmit antenna; reception circuitry arranged to receive power-related information fed back from the receiver, relating to a power from the one or more selected transmit antennas as received at the receiver over said channel; and signal processing apparatus coupled to the transmission and reception circuitry, configured to use said power-related information to generate channel-related information relating to the transmit-diversity scheme; wherein the signal processing apparatus is further configured to use the generated channel-related information to select only a selected one or more of the multiple transmit antennas to use for subsequent transmission to the receiver.

The signal processing apparatus may be further configured in accordance with any of the methods described herein.

According to another aspect of the present invention, there is provided a program product for transmitting from a transmitter to a receiver over a channel using a transmit diversity scheme whereby data can be transmitted from a selected one or more of multiple transmit antennas of the transmitter, the program product comprising code embodied on a computer-readable medium and configured so as when executed on a processor to: receive power-related information fed back from the receiver, relating to a power from the one or more selected transmit antennas as received at the receiver over said channel; use said power-related information to generate channel-related information relating to the transmit-diversity scheme; and use the generated channel-related information to select only a selected one or more of the multiple transmit antennas to use for subsequent transmission to the receiver.

The code may be further configured to perform any of the method steps described herein.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 1:
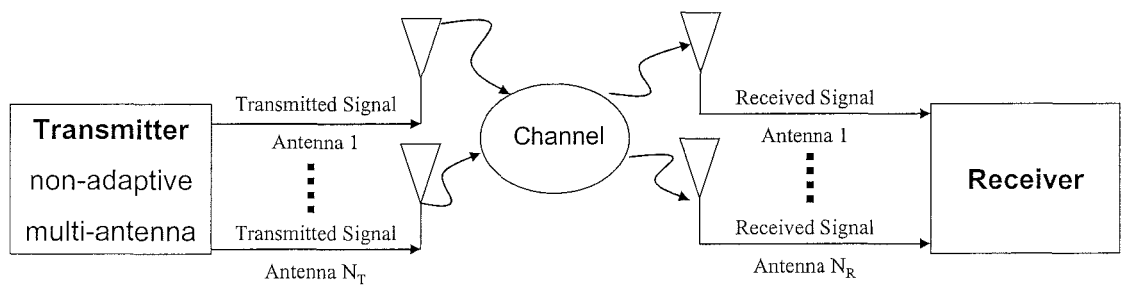
FIG. 1 is a schematic block diagram showing a generic forward link for non-adaptive multi-antenna transmission techniques.
Figure 2:
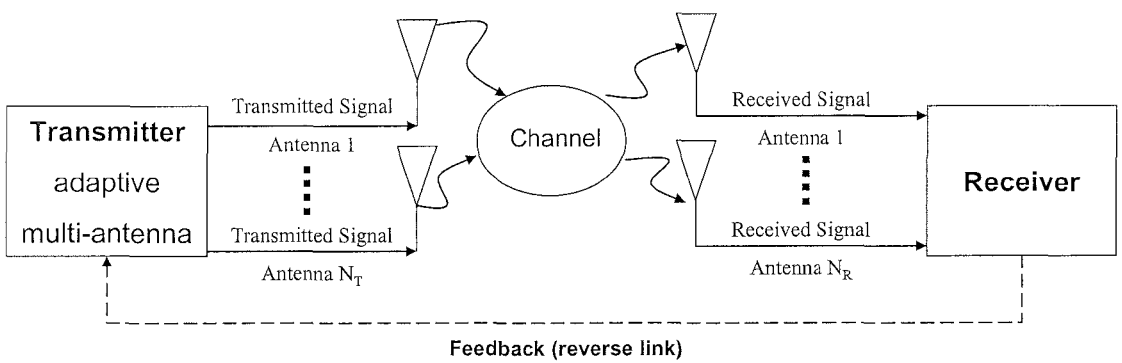
FIG. 2 is a schematic block diagram showing a generic forward link for adaptive multi-antenna transmission techniques.
Figure 3:
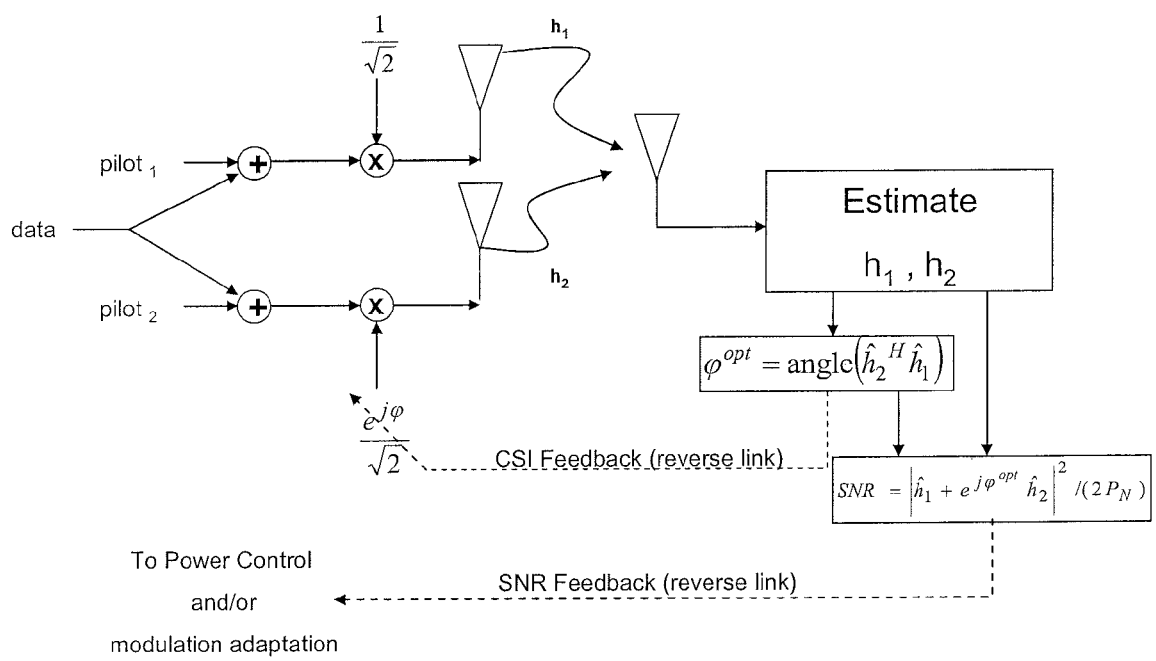
FIG. 3 is a schematic block diagram showing phase adaptation for multiple transmit antennas with explicit feedback of CSI.

As discussed, the use of multiple transmit antennas can deliver important improvements in terms of power, link quality and capacity. To best exploit these improvements, knowledge of the channel is needed at the receiver. However, traditionally an explicit feedback of the channel state information (CSI) from the receiver to the transmitter is used. This traditional solution leads to increased signalling overhead on the system and requires new changes to the existing standards. According to preferred embodiments of the present invention on the other hand, there is provided a scheme that uses the already existing signal to interference-plus-noise ratio (SNR) and/or power control feedbacks to generate channel state information locally at the transmitter in order to perform the multiple transmit antenna adaptation. The preferred scheme can be used for any number of transmit and receive antennas, and adds very little complexity at the transmitter and no modifications at all to the receiver. The preferred scheme requires no change to the existing standards and the receiver can remain unaware of the use of the proposed scheme at the transmitter.

Thus the preferred embodiments provide ways of exploiting SNR and/or other power related feedbacks, which often already do exist in legacy systems, to generate CSI information in order to be used in multi-antenna transmit adaptation. As mentioned, power control commands like the Transmit Power Control (TPC) used in the 3GPP standard, or SNR related feedbacks like the Channel Quality Index (CQI), can be used to generate the channel state information.

This means the preferred embodiments provide a scheme that can be used at the transmitter for multiple transmit antenna adaptation, but that does not require any change to the specifications for single antenna transmission, and relies fully on the already existing SNR based and/or power control feedbacks to adapt the transmission in order to achieve the optimal multiple transmit antenna weightings (phase and/or amplitude).

The preferred scheme is totally transparent to the standard and to the receiver side. The transmitter uses the SNR and/or power control feedbacks from the reverse link to adapt the transmission to achieve the best benefit from the use of multiple transmit antennas. The adaptation is done by means of different weightings applied on different transmit antennas (as well as a possible use of adaptive modulation and coding scheme). The weightings may represent different phases, and/or may represent different amplitudes (corresponding to different transit powers on the different antennas)

In particularly preferred embodiments, the feedback may optionally also be used to determine a reliability measure of the generated CSI, as will be discussed in more detail later. The CSI and the reliability measure are then used to adapt the multi-antenna transmission.

By way of comparison, two alternative techniques for adaptive multiple-antenna transmission without feedback of CSI are described in more detail below: one which simply tracks the optimal phase between antennas, and one which generates CSI according to preferred embodiments of the invention.

One way would be to use a direction discovery algorithm. This would be suitable for optimal phase tracking in the case that the power gain between transmit antennas is maintained constant and only the phase between antennas is adapted.

The preferred embodiment on the other hand "extracts" the CSI using a Kalman filter algorithm. This embodiment provides a more general algorithm that can be used for the general case of beamforming where the relative power gain and phase between the antennas are both adapted, as well as for the case where only the phase between antennas is adapted.

Figure 4:
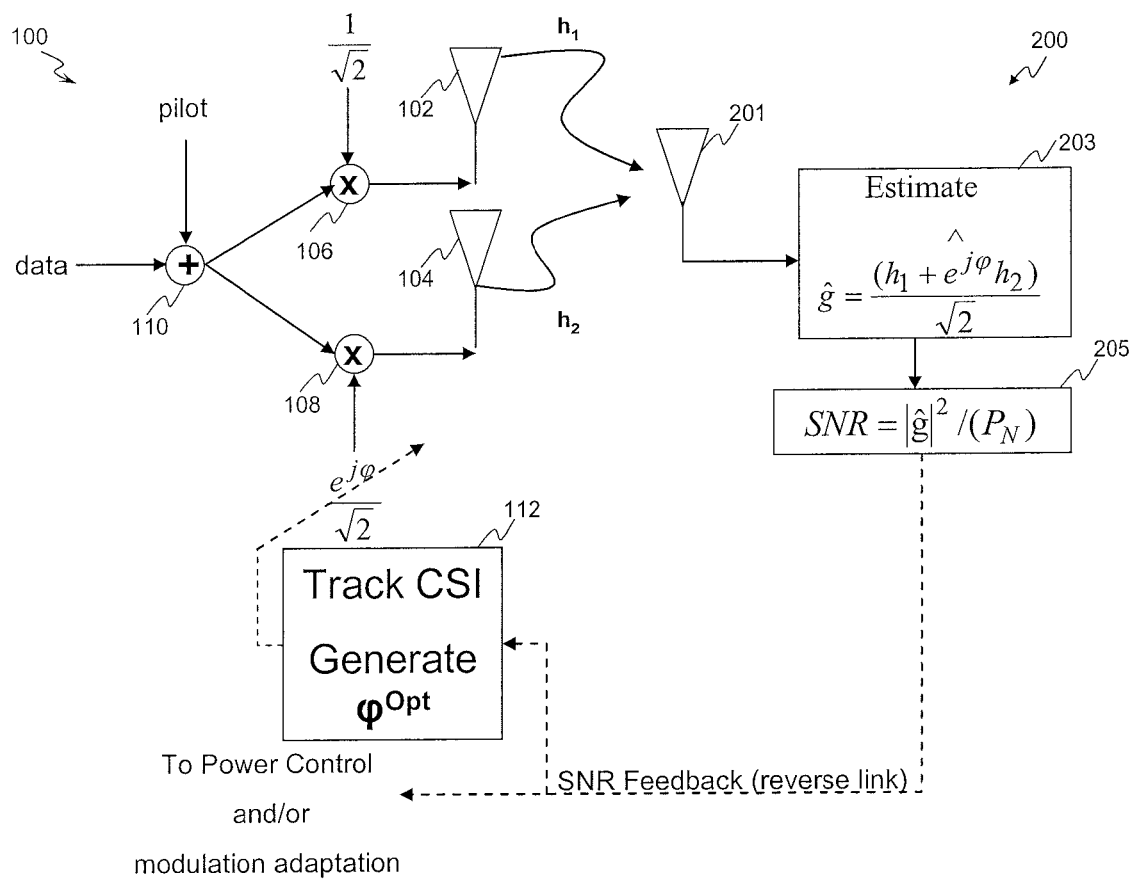
FIG. 4 is a schematic block diagram showing phase adaptation for multiple transmit antennas with generation of CSI.

The use of the direction discovery algorithm is now described in relation to FIG. 4. This algorithm is suitable for the case where only the phase between transmit antennas is adapted.

FIG. 4 shows a transmitter 100 having two transmit antennas in communication with a receiver 200 having one or more receive antennas. Accordingly, the transmitter 100 comprises two transmit-diversity branches: a first branch comprising a first multiplier 106 and a first antenna 102 coupled to the output of the first multiplier, and a second branch comprising a second multiplier 108 and a second antenna 104 coupled to the output of the second multiplier. The transmitter 100 also comprises a multiplexer 110 having its output operatively coupled to inputs of each of the first and second multipliers 106 and 108. The multiplexer 110 is arranged to receive a data signal and a pilot signal, to multiplex the two, and to supply the resulting multiplexed signal to the inputs of each of the multipliers 106 and 108. Thus each of the two branches are arranged to receive the same data and the same pilot (note that since the receiver 200 will not be required to estimate the two diversity channels then there is no need for two different pilot signals).

The other input of each of the first and second multipliers 106 and 108 is arranged to receive a respective first and second weighting factor. In the example shown, the first weighting factor of the first multiplier 106 is a fixed value $1/\sqrt{2}$, and the second weighting factor of the second multiplier 108 is a complex value having fixed amplitude $1/\sqrt{2}$ and variable phase $e^{j\phi}$. The relevant input of the second multiplier 108 is operatively coupled to a CSI tracking block 112 in order to generate and supply the second, variable-phase weighting factor. The receiver 200 comprises one or more receive antennas 201 operatively coupled to the input of a channel estimation block 203, and the output of the channel estimation block 203 is operatively coupled to the input of an SNR estimation block 205. The SNR estimation block 205 has an output arranged to feed back information from the receiver 200 to the transmitter 100 on a reverse link.

Each of the CSI tracking block 112, multiplexer 110, and multipliers 106 and 108 are preferably implemented as software modules at the transmitter 100, being stored on a memory such as a ROM, flash memory or hard-drive and executed on a processor (not shown). Similarly, each of the SNR estimation block 205 and channel estimation block 203 are preferably implemented as software modules at the receiver 200, being stored on a further memory and executed on a further processor (also not shown). However, the option of some or all of these components being implemented wholly or partially in dedicated hardware is not excluded.

In operation, the transmitter 100 takes the data signal, multiplexes it with the pilot signal, then supplies the resulting signal down each of two branches via the two respective multipliers 106 and 108 to the two antennas 102 and 104. Thus the transmitter 100 transmits two different versions of the same signal from two different transmit antennas, each version of the signal having the same data content but being multiplied by a different weighting factor, in this case by $1/\sqrt{2}$ and $e^{j\phi}/\sqrt{2}$ respectively such that each version has the same amplitude but a different phase. The relative phase $\phi$ on the second branch 104, 108 is variable by virtue of the coupling of the variable multiplier 108 to the CSI tracking block 112.

The transmitter 100 therefore transmits on two different transmit-diversity channels $h_1$ and $h_2$, corresponding to the first and second antennas 102 and 104 and their associated branches. However, because the present invention preferably requires no update to the behaviour of the receiver, the receiver 200 only "sees" one overall or combined channel $\hat{g}$. The receiver 200 does not need to see the diversity in order to benefit from it. Therefore the receive antenna 201 receives the signal as transmitted from both transmit antennas 102 and 104, and the channel estimation block 203 estimates the combined channel $\hat{g}$ as a single channel without awareness of the diversity. In this example the combined channel $\hat{g}$ is equal to $(h_1 + e^{j\phi} h_2)/\sqrt{2}$, and this is labelled in FIG. 4 for illustrative purposes, for the information for the reader only—but note that unlike prior art solutions, the channel estimation block 203 does not actually need to be aware of this fact nor perform this calculation. Instead the channel estimation block 203 estimates the combined channel $\hat{g}$ simply as a single channel, based on the single pilot signal using known techniques for estimation of a single channel. In the following description, "the channel" will refer to the overall or combined channel, such as $\hat{g}$. Note that $\hat{g}$ can be a vector in the case where multiple receive antennas and/or oversampling of the received signal are used.

The channel estimation block 203 then outputs the estimated channel $\hat{g}$ to the SNR estimation block 205, which uses it to calculate the SNR, e.g. SNR=$|\hat{g}|^2/P_N$ where $P_N$ is the received noise-plus-interference power.

In most applications some measure of the received power is fed back in one form or another. The transmitter 100 can take advantage of this feedback to extract the knowledge of the optimal transmit phase without any additional overhead to the system. In the example of FIG. 4 the SNR is fed back to allow transmit power control (and/or an adaptive modulation and coding scheme). The SNR is a concave function of the phase angle $\phi$ with a unique maximum. Therefore, the transmitter 100 can use a variety of algorithms to take advantage of the SNR feedback in order to track/generate the optimal phase between the two transmit antennas 102 and 104.

So referring to the illustrated elements in FIG. 4, the SNR estimation block 205 of the receiver 200 feeds back an indication of the SNR to the transmitter CSI tracking block 112 of the transmitter 100 on the reverse link. The CSI tracking block 112 then uses the received SNR to generate the CSI locally at the transmitter 100, without the CSI needing to be explicitly or separately fed back from the receiver 200. Based on the locally-generated CSI, the CSI tracking block then varies the phase angle $\phi$ between the first and second antennas 102 and 104, and outputs the relevant weighting factor $e^{j\phi}/\sqrt{2}$ to the second multiplier 108. Some example algorithms for doing this are discussed in more detail below.

The tracking of the optimal phase assumes that the channel varies slowly enough—with respect to the frequency of the feedback—to allow for an accurate tracking.

An example of a direction discovery algorithm which the CSI tracking block 112 may use to actually determine $\phi$ is now discussed. The direction discovery algorithm for phase tracking works by deciding whether the previous direction taken by the tracking algorithm was a good direction and move toward the maximum in the next transmission instant.

We denote by $\phi_n$ the phase angle applied to the diversity antenna at the time instant n. $\Delta\phi$ is the step size with which the phase angle is updated and $SNR_n$ is the power feedback corresponding to transmission instant n which used the phase angle $\phi_n$.

Variable $d_n$ denotes the direction which was used to update the phase angle at time instant n. The variable $d_n$ can take only one of the values +1 or −1. The initial phase and direction can take any possible value, for example $\phi_n$=0, $d_0$=+1.

In the time instant n+1, the phase is then updated in the following way:

$$\begin{cases} \text{if } (SNR_n < SNR_{n-1}) \\ \quad d_{n+1} = -d_n, \\ \quad \text{else} \\ \quad d_{n+1} = d_n, \\ \varphi_{n+1} = \varphi_n + d_n \Delta\varphi. \end{cases}$$

The step size $\Delta\phi$ is chosen in order to ensure a compromise between tracking speed and convergence precision. It must also respect the product specification like the phase discontinuity for the 3GPP WCDMA uplink (section 6.8.4 TS 25.101) [3GPP TS 25.201, "User equipment (UE) radio transmission and reception (FDD)", March 2009, Section 6.8.4].

Instead of the SNR as a feedback, the algorithm works equally well with a quantised version of it like the CQI, or other indirect measures of SNR like success or failure of the detection (acknowledgement (ACK)/non-acknowledgement (NACK)) can also be used with some differences in the mapping. As an example, the TPC command can be used in the following way:

$$\begin{cases} \text{if } (TPCcmd_n > 0) \\ \quad d_{n+1} = -d_n, \\ \quad \text{else} \\ \quad d_{n+1} = d_n, \\ \varphi_{n+1} = \varphi_n + d_n \Delta\varphi. \end{cases}$$

$TPCcmd_n$>0 means that the receiver had asked for a power up following the transmission at instant n, and therefore—ignoring the action of the power control—the TPC command means that most likely the previous direction taken by the phase change led to a decrease in the received SNR and is therefore the wrong direction. Because of the interaction with the power, this is not always correct. However, because the phase is adjusted only by a small amount each time, these observations (measurements) are averaged and the algorithm still converges to a good solution.

ACK/NACK is equivalent in many ways to TPC command. By analogy ACK would be a power down indication and NACK would be a power up indication. The difference is that in most cases power up (NACK) would be weighted more than power down (ACK) as systems are usually designed to work with low probability of error (low occurrences of NACKs). The design of the weighting of the respective ACK/NACK depends on the application and could be made real time adaptive to maximise performance.

The algorithm can be directly used in the case of more than one receive antenna.

The algorithm can also be generalised to the case of more than two transmit antennas by applying the tracking to each of the diversity antenna phases separately and sequentially in time.

In case of a frequency selective channel, the SNR takes in account the interference. For cases where the noise is the dominant factor, the SNR is still a concave function of the phase and has therefore a unique minimum, but when the interference is the dominant factor the SNR is no more concave and the algorithm could converge to a local minimum instead of the global one. Even in this scenario the algorithm still delivers very good improvements.

Figure 5:
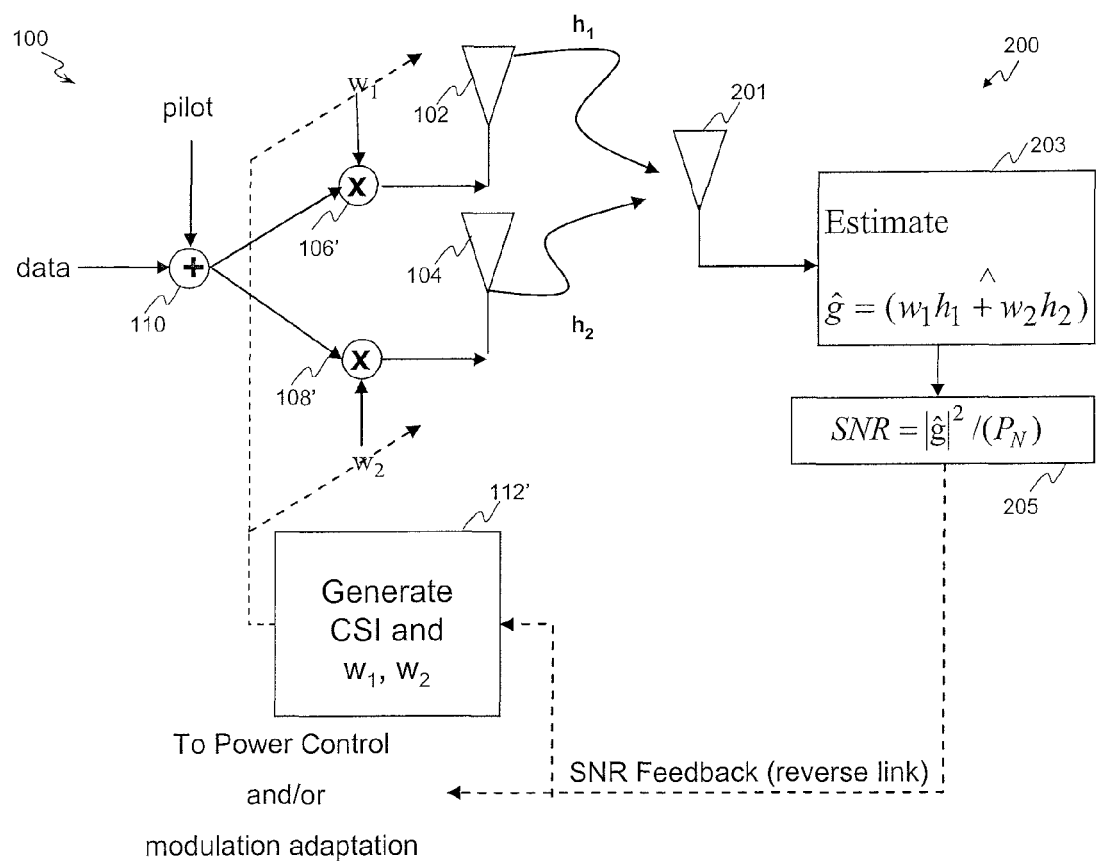
FIG. 5 is a schematic block diagram showing beamforming adaptation with generation of CSI.

The direction discovery algorithm tracks the optimal phase. However to use beamforming techniques where both the phase and the power gain are optimised, then a more general approach is preferred, e.g. based on Kalman filtering. An example according to a preferred embodiment of the present invention is now described in relation to FIG. 5.

The described components of the transmitter 100 are substantially similar to those described in relation to FIG. 4, except that: the CSI tracking block is a CSI generation block 112', the first multiplier 106' in the first branch also has an input operatively coupled to the CSI generation block 112', the first multiplier 106' is arranged to receive from the CSI generation block 112' a first weighting factor $w_1$ having a variable phase and amplitude, the second multiplier 108' is arranged to receive from the CSI generation block 112' a second weighting factor $w_2$ also having a variable phase and amplitude. The CSI tracking block 112' operates according to a different algorithm, a preferred example of which is discussed below. The components are again preferably implemented in software stored in a memory and executed on a processor of the transmitter 100, but whole or partial hardware implementations are not excluded.

The described components of the receiver 200 may be substantially similar to those described in relation to FIG. 4. Particularly, note that since the whole transmit diversity process is invisible to the receiver 200 (except in terms of the performance benefits it experiences) then the details of the algorithm used by the CSI generation block 112' at the transmitter 100 are irrelevant to the receiver 200.

In this example the combined channel is described by $\hat{g}=(w_1 h_1 + w_2 h_2)$. For illustrative purposes this is labelled in FIG. 5, for information for the reader only, but again note that the channel estimation block 203 at the receiver 200 does not need to know about this nor perform this calculation. Rather, just as in the example of FIG. 4, the channel estimation block 203 only sees the combined channel $\hat{g}$ as a single channel, and estimates it as such using the single pilot signal.

According to the second exemplary embodiment, CSI extraction using a Kalman filter algorithm is now described in more detail. In this embodiment, the transmitter's knowledge of the transmit beamforming vector can be used together with the feedback on the reverse link to "extract" CSI by applying a Kalman filtering approach.

A Kalman filter is a recursive filter whereby the output state for a current interval in time is derived from the output state of a preceding interval in time. Particularly, the idea behind a Kalman filter is that the output $x_n$ for some current time interval n is derived in two stages: firstly, by estimating the output $x_n$ for the current time n based on some transfer function $A_n$ of the output $x_{n-1}$ for the previous time interval n−1; and secondly, by refining the estimate based on some transfer function $B_n$ of a measurement $m_n$ for the current time interval n. A noise term may also be taken into account. For example, this could be written in the form:

$$x_n = A_n x_{n-1} + B_n m_n (+\text{noise})$$

An example now follows.

In the case of the availability of SNR feedback, the SNR can be written in the following form:

$$SNR_n = W_n^H R W_n,$$

where $W_n$: $N_T \times 1$, $\|W_n\|^2=1$ is the beamforming vector and R: $N_T \times N_T$ is the Hermitian positive covariance matrix of the channel H:

$$R = H^H H,$$

where H is the $N_R \times N_T$ complex values channel matrix, with $N_R$ the number of receive antennas and $N_T$ the number of transmit antennas.

If the directions that are taken by the beamforming vectors are diverse enough the matrix R can be reconstructed at the transmitter. From R the best beamforming vector can be calculated.

Figure 6:
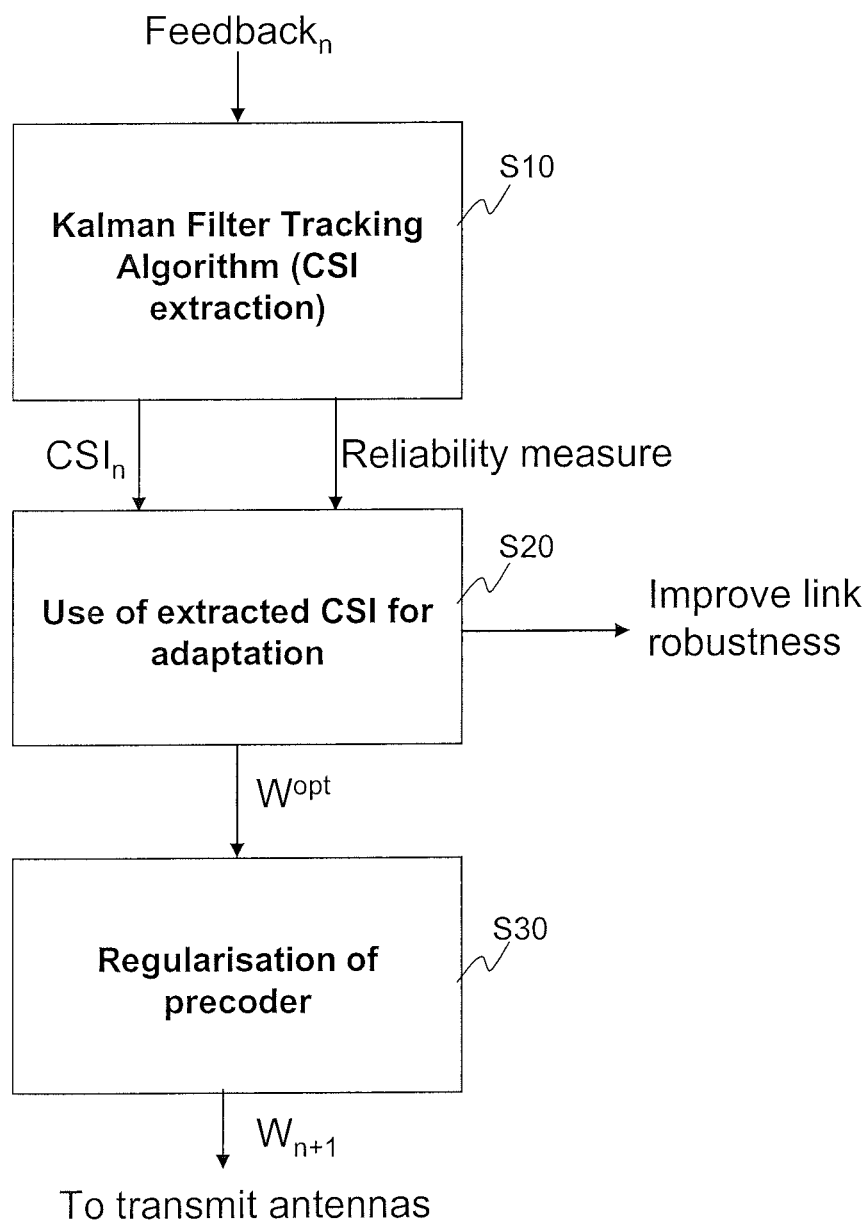
FIG. 6 is a functional diagram of beamforming adaptation based on use of Kalman filter for CSI extraction.

The preferred technique is organised in the following steps, illustrated schematically in the functional diagram of FIG. 6. That is, at each time instant perform the following steps.

Step S10: Kalman filter tracking algorithm. Run a Kalman filter to extract the CSI from the feedback.

Step S20: use of extracted CSI. Use the CSI to perform the transmit adaptation, in particular to calculate the best precoding (beamforming) vector.

Step S30: regularisation of precoder. Regularise the precoding vector to ensure that enough diversity of directions is used to ensure proper tracking of the CSI.

An example of such a process is described in more detail below, but first some notation is introduced.

We start by introducing the notation we use for Kalman filtering. Generally it may be assumed that for all the applications where the Kalman filter is used for CSI extraction, the power related measurement (I.e. the feedback) is in the form:

$$M_n = W_n^H R W_n + v_n,$$

where $v_n$ is an additive noise term with variance $\sigma_v^2$ and R is a Hermitian matrix that represents the CSI.

Therefore, the measurement can be written in the following form:

$$M_n = (W_n^T \hat{\times} W_n^H) \text{vec}(R) + v_n,$$

where vec(R): $N_T^2 \times 1$ is the vector form of the matrix R and $\hat{\times}$ is the Kronecker product. Written in real parameterisation the measurement is $$M_n = s_n^T r + v_n,$$

with $r = T^{-1} \text{vec}(R)$, where T: $N_T^2 \times N_T^2$ is the transfer matrix that allows to go from real to complex representation of the vector form of the Hermitian matrix. $s_n^T = (W_n^T \hat{\times} W_n^H) T$: is the direction of the measurement (observation) made on r.

For simplicity the time evolution of CSI is modelled using an autoregressive model:

$$r_n = \lambda r_{n-1} b_n,$$

where λ is the forgetting factor. $\lambda (0 \leq \lambda \leq 1)$ can be adjusted to either track the short term (instantaneous) or the long term CSI.

$b_n$ is the innovation which is modelled as a real Gaussian variable with mean 0 and covariance $Q = P_0 (1-\lambda^2) I_{N_T}$ where $P_0$ is the average power of the components of r and $I_{N_T}$ is the identity matrix of size $N_T \times N_T$.

More general models can be used to model the time evolution of the CSI.

Step S10, the Kalman filter tracking algorithm, is now discussed. The Kalman filter algorithm consists of two stages or sub-steps, as follows.

The first sub-step is the time update equations:

$$r_{n+1} = \lambda r_n$$

$$C_{n+1} = \lambda^2 C_n + Q$$

$$\sigma^2 = s_n^T C_{n+1} s_n + \sigma_v^2$$

The second sub-step is the measurement update equations:

$$K = (\sigma^2)^{-1} C_{n+1} s_n$$

$$r_{n+1} = r_{n+1} + K(M_n - s_n^T r_{n+1})$$

$$C_{n+1} = C_{n+1} - K s_n^T C_{n+1}$$

Each $r_n$ maps to a complex Hermitian matrix $R_n$, which represents the extracted CSI at time instant n.

$C_n$: $N_T^2 \times N_T^2$ is the covariance matrix of the error on $r_n$ and thus corresponds to a reliability measure of the CSI.

Initially $(r_0, C_0)$ can take any initial value. For example $(r_0 = 0, C_0 = P_0 I_{N_T^2})$.

Step S20, the use of Extracted CSI, is now discussed. Once the CSI is extracted it can be used for any adaptation of the transmission. The reliability measure $C_n$ can also be taken in account when performing the adaptation, for example to improve the robustness.

As one example, in the case of beamforming and in case the feedback corresponds to a measure of the CQI, the strongest gain is achieved by the strongest eigenvector of the Hermitian matrix of the channel $R_n$.

The eigenvector decomposition is written as follow:

$$R_n = UDU^H$$

where $U = [u_1, u_2, \ldots, u_{N_T}]$ is a unitary matrix $U^H U = I_{N_T}$, and D is a diagonal matrix which diagonal elements are the eigenvalues ordered in the descending order. The strongest eigenvector corresponds to the strongest eigenvalue. The optimal beamforming direction matches the strongest eigenvector of the Hermitian matrix of the channel:

$$W^{opt} = u_1.$$

As another example, in the case of phase adaptation with two transmit antennas. Assuming that the feedback corresponds to a measure of the SNR, in the case of two transmit antennas $N_T = 2$ the Hermitian matrix of the channel $R_n$ is $$R_n = \begin{bmatrix} R_n^{11} & R_n^{21*} \\ R_n^{21} & R_n^{22} \end{bmatrix}.$$

The optimal phase in this case is $$\sigma^{opt} = \text{angle}(R_n^{21})$$

Step S30, the regularisation of precoder, is now discussed. For the Kalman filter to operate to its best potential, enough diversity of directions is required. To avoid idle points when one (or a subset of) precoding vectors get used all the time preventing full CSI extraction, some regularisation is required to ensure enough diversity of directions is provided.

For illustration here is an example of a regularisation that can be used for the beamforming case:

$$\begin{cases} \text{if } (\|W^{opt} - W_n\| \geq \delta) \\ \quad W_{n+1} = W^{opt} \\ \text{else} \\ \quad W_{n+1} = W^{opt} + \zeta, \end{cases}$$

or in other words if the distance between the optimal beamforming vector $W^{opt}$ and the beamforming vector used in the previous transmission $W_n$ is above a threshold $\delta$ then $W^{opt}$ is used for the next transmission. In case the distance is less than $\delta$ a regularisation $\zeta$ is added and the vector $W^{opt} + \zeta$ is used in the next transmission.

The designs of $\delta$ and $\zeta$ have to be done is a way to ensure enough diversity but must be kept small enough not to degrade performance by deviating too much from the optimal solution.

In other implementations of the present invention, other types of feedback can also be used, for example TPC commands. In the case where the TPC command is used for CSI extraction, the measurement is taken as:

$$M_n = -\text{TPCcmd}_n.$$

The power control effect could be included in the noise, in which case the feedback measurement can be modelled as:

$$M_n = \alpha(SNR_n - SNR_{n-1}) + v_n$$
$$= \alpha(W_n^H H^H H W_n - W_{n-1}^H H^H H W_{n-1}) + v_n$$
$$= W_n^H(\alpha H^H H - \alpha W_{n-1}^H H^H H W_{n-1} I_{N_T}) W_n + v_n,$$

where $\alpha$ is a positive scaling factor.

The Hermitian matrix in this case can be taken as:

$$R = \alpha H^H H - \beta_n I_{N_T},$$

where $\beta_n$ is a scalar $\beta_n = \alpha W_{n-1}^H H^H H W_{n-1}$.

R has the same eigenvectors and the same order of the eigenvalues as the Hermitian matrix of the channel. Also the phase of the non-diagonal elements is not affected. Therefore both the optimal beamforming vector and the optimal phase adaptation solutions derived in the case where the SNR was used for CSI tracking are also valid here.

Other forms of measurement based on the TPC can also be used. For example:

$$M_n = P_n^{-1} 10^{(-TPCcmd_n * \Delta / 10)},$$

where $\Delta$ is the step in dBs used to increase/decrease the transmit power as a response to the TPC command and $P_n$ is the transmit power.

This or other forms of measurement could be combined, for instance averaged, over a period spanning L transmissions intervals to improve performance.

The above describes a first scheme in which the relative phases and/or amplitudes of multiple transmitters are varied based on a recursive filter algorithm such as a Kalman algorithm. According to another aspect of the present invention, there may be provided a second scheme in which only a selected one of the multiple antennas is used at any one time. In this case, at each time all the power is allocated to one transmit antenna (for instance the $i^{th}$ antenna), and therefore the beamforming vector $W_n$: $N_T \times 1$, has only one non-zero component:

$$W_n = [0, \ldots, 0, 1, 0, \ldots, 0]^T,$$

with 1 at the $i^{th}$ position.

The SNR at the receiver is:

$$SNR_n = P_n W_n^H R W_n = P_n |h_i|^2,$$

where $P_n$ corresponds to the power on the $i^{th}$ antenna used for transmission at instant n.

In this second mode of operation, due to the constraint that the transmit antennas cannot be used simultaneously, the SNR contains no information on the phases and only CSI relating to transmit antenna powers can be extracted.

The Kalman filter (or an alternative filter) can now be used to extract CSI on the transmit antenna powers:

$$r_n = [|h_1|^2, \ldots, |h_{N_T}|^2]^T.$$

A preferred example of a measure of the transmit channel powers is:

$$M_n = P_n^{-1} 10^{(-TPCcmd_n * \Delta/10)},$$

where $\Delta$ is the step in dBs used to increase/decrease the transmit power as a response to the TPC command.

This measurement is modelled in the form:

$$M_n = s_n^T r + v_n,$$

where now $s_n^T = [0, \ldots, 0, 1, 0, \ldots, 0]$ with 1 at the $i^{th}$ position.

More generally if the measurement is averaged over L transmissions, $$\overline{M} = \frac{1}{L} \sum_{l=1}^{L} P_l 10^{(-TPCcmd_l * \Delta/10)},$$

it could be modelled as:

$$\overline{M} = \frac{1}{L} \sum_{l=1}^{L} M_l = \left( \frac{1}{L} \sum_{l=1}^{L} s_l^T \right) r + v.$$

If we denote by $L_i, i=1, \ldots, N_T$, the number of times the $i^{th}$ antenna is used, then the averaged measurement model can be simplified to:

$$\overline{M} = \overline{s}^T r + v,$$

where $\overline{s}^T = \left[ \frac{L_1}{L}, \frac{L_2}{L}, \ldots, \frac{L_{N_T}}{L} \right].$ To be able to extract the transmit antenna powers, it is preferable that through time the measurements directions $\overline{s}^T/\overline{s}^{-T}$ span all the $N_T$ dimensional space (so that measurements are diverse enough).

The extracted CSI on the transmit antenna powers can be used to determine which transmit antenna to use more often in order to improve performance.

However, it is still preferable to use the other transmit antennas from time to time, to ensure enough directions are covered in order to ensure convergence, i.e. to ensure reliable CSI information. For instance if a transmit antenna is not used for a very long time, no useful information would be available about its power.

The idea of selecting antennas can be generalised to selecting one or more of the multiple transmit antennas on which to transmit, e.g. selecting only $i^{th}$ and $j^{th}$ elements $(0, \ldots 1/\sqrt{2}, \ldots, 1/\sqrt{2}, \ldots 0)$ (but without varying phase or relative amplitude). The general form may be implemented by dividing the transmit antennas into several sets $S_p$, $p=1 \ldots P$, each set corresponds to $N_p$ antennas that are used jointly, and at each transmission only one of the set $S_p$, $p=1 \ldots P$ is used. The different sets could have different numbers of antennas.

The above has described both a first scheme in which multiple transmit antennas are used simultaneously, and a second scheme in which only a selected one or more of the transmit antennas is used. The second scheme is not superior to the first scheme in terms of performance, but is simpler and less costly—it requires fewer new RF components and may incur less CPU resource depending on implementation. The decision to use one scheme or the other may be a matter of initial design. In other embodiments however, the transmitter may be configured to allow operation in either a first mode of operation running the first scheme or a second mode of operation running the second scheme. This may be useful if the one scheme incurs less processing resources or power. In certain implementations the second scheme may incur less processing resource (fewer CPU cycles, less memory resource, etc.). E.g. if for the first scheme the phase rotation is applied in digital, then the complexity gain is high; but if for the first scheme the phase rotation is applied in analogue, then the complexity gain is less significant.

Hence the transmitter's processor may be configured to switch between the schemes based on the available processing resources (processing cycles and/or memory, etc.), which may vary due to resources consumed by other operations (e.g. see WO 2009/056504).

Further, although the second scheme is not superior in performance to the first scheme, it may be preferred to use the second scheme in certain "corner" cases. One particular example would be for initial transmission of the RACH (Random Access Channel) in which the TPC feedback is not available, in which case the processor may be configured to switch to the second scheme.

Hence the processor may be configured to switch between the schemes based on the transmission mode and the relative applicability of each scheme to the transmission mode in question (e.g. RACH procedure or normal transmission, etc.)

Generally speaking any condition may be used to switch between schemes, e.g. where that condition is related to processing cost, power consumption, and/or applicability to a particular transmission mode.

It will be appreciated that the above embodiments are described only by way of example.

In another implementation, acknowledgement messages and non-acknowledgement messages like ACK and NACK can be used as the feedback for a Kalman type algorithm. As discussed above, ACK/NACK can be used in analogy to power control commands. ACK and NACK are related to the received signal-to-disturbance power ratio at the receiver. They are not a direct power measure, but they are a result of the decoding process of the system, and the success of the decoding process will depend on the received signal-to-disturbance power ratio. ACK and NACK are therefore equivalent in many ways to TPC commands. By analogy, ACK would correspond to a power down indication and NACK would correspond to a power up indication, the only difference being that a power up (NACK) would preferably be biased or weighted much more than power down (ACK) because the system is often designed to work with low probability of error (low occurrences of NACKs). This different weighting between ACK and NACK could be fixed, or could be made adaptive such that it is varied to try to maximise the long term gain in terms of transmit power saving and/or link capacity, or any other long-term performance metric.

Advantageously, the invention can be applied in a number of different situations.

For instance, the described techniques of generating the CSI at the transmitter can equally be used at the base station (transmission on the downlink) or at the user equipment (transmission on the uplink) in cellular systems. More generally the technique can be used at both ends of any communication system where both the forward link and the reverse link are active.

The described techniques can be applied at both sides of the link separately or jointly, and can be adapted to account for latency of the feedback coming from the receiver on the reverse link.

Further, the CSI time evolution model can be adapted to generate short term CSI (for autoregressive model λ close to 0) or long term CSI (for autoregressive model λ close to 1). The adaptation decision on whether to generate short term or long term CSI can be made based on the channel variation speed which can be inferred from the reverse link by mean of Doppler estimation for example.

In some cases the receiver may have some latency in generating the CSI feedback, this may translate in some delay between the change in the transmit adaptation and the CSI feedback re-acting to it. Particularly advantageous embodiments of the present invention can avoid this problem by decreasing the frequency at which the adaptation is done. For example, after the transmitter starts using a new precoding vector it may wait P time instants before collecting the CSI feedbacks and using it for adaptation. In the case of SNR feedback the transmitter can look to the latest feedback for example, but in the case when TPC command is used then the transmitter may instead use the cumulative of power commands over the last P time instants. The exact value of P can be a design parameter that can take in account the most likely latencies that can occur at the receiver when trying to limit the impact of slower adaptation. It is also possible to adapt the value of P by calculating in real time the benefit achieved by the adaptation scheme, e.g. in terms of received power. So thus the latency in generating feedbacks at the receiver can be accommodated by decreasing the frequency of the adaptation and combining the feedbacks over longer observation period. The frequency of the adaptation can be fixed or adaptive to maximise the benefit. Depending on the application, the adaptation could aim at reducing the long term transmit power, increasing the link long term capacity or maximising any other performance metric.

On a point of terminology, note that the term "channel state information" is not necessarily intended to refer to the specific CSI as may be defined in any one particular standard. In the context of a CSI fed back from the receiver, channel state information is often meant to refer to the receiver's preferred phase difference or perhaps more generally preferred weightings, or change in weightings. However, in the above description, the locally-generated channel state information determined at the transmitter may be any information relating to the diversity of the channel, i.e. how the transmission from one of the multiple transmit antennas differs from the transmission from another of the multiple transmit antennas, or how the relative weightings of the antennas should be set or changed to exploit such a difference. For example, in the preferred embodiment described above, the channel state information could for example be considered to comprise the result $r_n$, the corresponding matrix $R_n$, and/or the phase difference $\phi^{opt}$ which the transmitter determines would be preferred for use in transmitting to the receiver.

Note also that term "SNR" as used in the context of current 3GPP standards actually refers to a ratio of the received signal to noise-plus-interference, not just signal to noise. More generally, "disturbance" may be used as an umbrella term to mean either noise (random or white noise) or interference (i.e. interference from other signals), or preferably a combination of noise and interference. The above examples are described in relation to SNR in the 3GPP sense, but there is no reason why other measures of signal power relative to disturbance cannot be used. Note also that a ratio may be determined by subtraction in the case where values are on a logarithmic scale.

More generally, any information relating to the received power can be used: the idea is that the transmitter can refine the CSI estimate using the feedback measurement in order to better control the phase and/or amplitude of the different transmit diversity branches and thereby try to maximise the received power at the receiver. The specific Kalman algorithm described above is not the only way to achieve this. Generally, any recursive algorithm could be used that estimates the channel state information for a current time period based on the estimated channel state information from a previous time interval, and refines the estimated channel state information for the current time interval using the information fed back from the receiver for the current time interval.

Further, note that the term "weightings" as used herein does not necessarily refer exclusively to different amplitudes: when the weighting factors are complex or imaginary, the weighting may affect only the relative phases of the transmit antennas, or both the phase and amplitude.

Note also that by "relative" weightings or varying the relative weightings, this could mean only a single weighting factor on one branch is explicitly applied or varied (e.g. in FIG. 4 the weighting on only the second branch 108, 104 is explicitly varied). That is, even if the weighting is applied to only one branch, this can still be said to affect the relative weightings of all branches since the relative weighting of each branch compared to at least one other branch is changed.

Other configurations and applications of the present invention may be apparent to the person skilled in the art given the disclosure herein. The scope of the invention is not limited by the described embodiments, but only by the appended claims.

To evaluate the effectiveness of the described solution, simulations have been carried out. The simulations measure the power improvement (saving) achieved by different schemes on the uplink DPCH channel of the WCDMA 3GPP standard. TPC commands are used to generate CSI at the user equipment to adapt the transmission using two antennas. The downlink TPC commands are generated assuming the use of algorithm 1 for processing TPC commands as in [3GPP TS 25.214, "Physical layer procedures (FDD)", December 2008, Section 5.1.2.2.2].

We assume 50% correlation between the transmit antennas and completed uncorrelated (0%) receive antennas. At the base station we assume that the system is dominated by the interference from the other users: ratio between the received signal power from the user of interest and the interference power from other users is −5 dB. At the base station a Rake receiver is assumed to be used, and the SNR used for TPC commands generation is measured at the output of the Rake.

Figure 7:
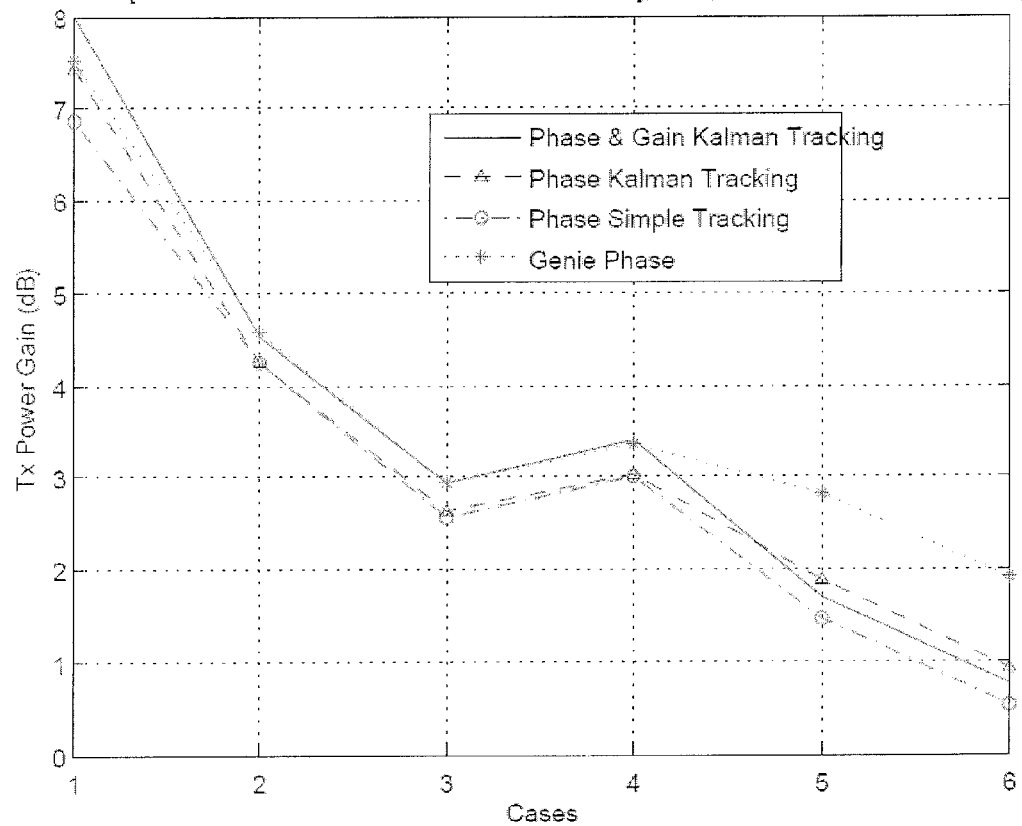
FIG. 7 is a graph showing transmit power gain of different transmit adaptation schemes for one receive antenna.
Figure 8:
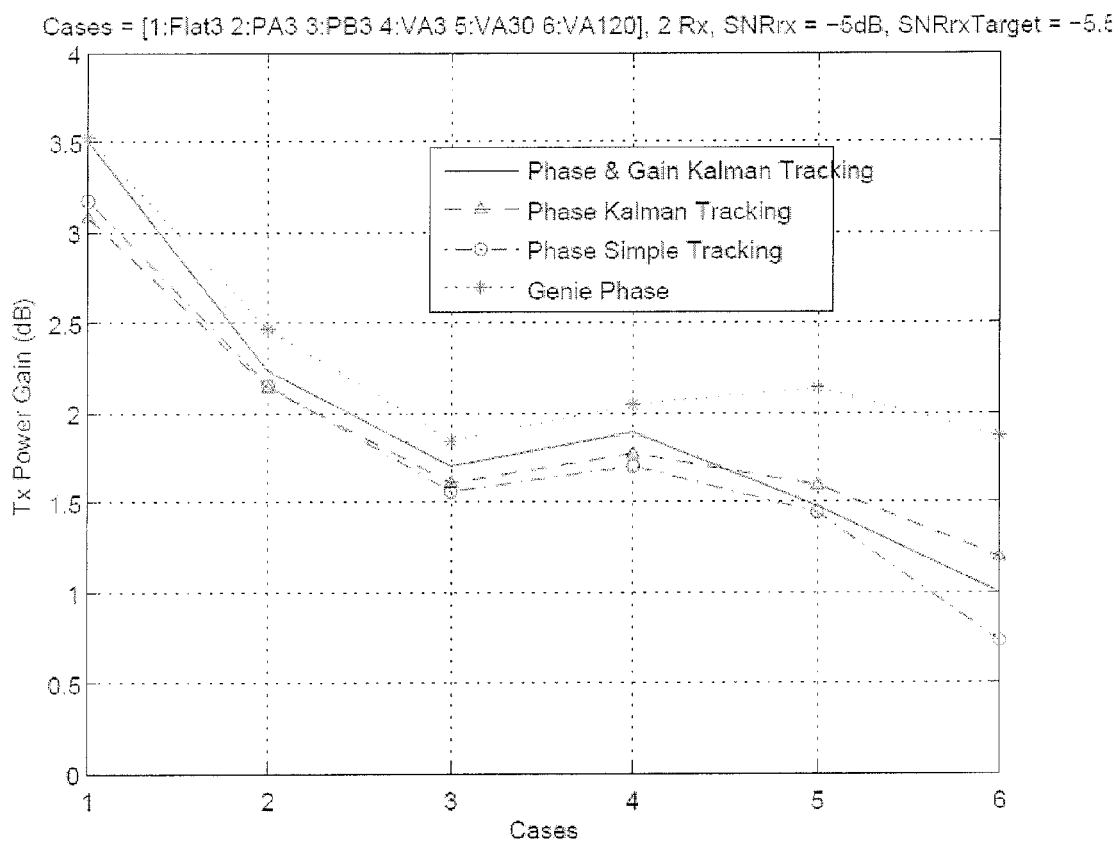
FIG. 8 is a graph showing transmit power gain of different transmit adaptation schemes for two receive antennas.

FIG. 7 shows the achieved power control gain in dB when one receive antenna is used at the base station (receiver) and FIG. 8 shows the achieved gain when two receive antennas are used. In both figures performance are shown for the following channel model cases:

Case 1 (Flat3): Flat channel propagation conditions, mobile speed 3 km/h.

Case 2 (PA3): Pedestrian A channel propagation conditions, mobile speed 3 km/h.

Case 3 (PB3): Pedestrian B channel propagation conditions, mobile speed 3 km/h.

Case 4 (VA3): Vehicular A channel propagation conditions, mobile speed 3 km/h.

Case 5 (VA30): Vehicular A channel propagation conditions, mobile speed 30 km/h.

Case 6 (VA120): Vehicular A channel propagation conditions, mobile speed 120 km/h.

Each of the figures shows four plots of performances:

'Phase & Gain Kalman Tracking': Label for phase and gain adaptation on both transmit antennas using Kalman filter approach for CSI extraction.

'Phase Kalman Tracking': Label for phase adaptation on the second transmit antenna using Kalman filter approach for CSI extraction.

'Phase Simple Tracking': Label for phase adaptation on the second transmit antenna using direction discovery algorithm.

'Phase Genie': Label for phase adaptation on the second transmit antenna assuming Genie knowledge of the channel at the transmitter (upper bound on performance of phase adaptation).

The performance results show that:

The gains of different schemes are close. Highest gains are achieved for Flat3 and lowest for VA120, indeed in the simulated scenarios transmit adaptation works best for flat channels and low speed.

For most common channels (PA3, PB3 and VA3) the gain is around 2.5 to 4.5 dB in case of 1 receive antenna and 1.5 to 2.5 dB for 2 receive antennas. The gains are higher when 1 receive antenna only is used at the base station.

Compared to the reference case where the channel is known to the transmitter, the gain degradation due to the tracking of the phase (using both proposed methods of tracking) is less than 0.4 dB for low speed (VA3) but get higher to around 1.5 dB for very high speed (VA120).

Using phase and gain adaptation instead of phase adaptation only shows a positive gain of around 0.3 dB for the case of 1 receive antenna but only around 0.15 dB gain for 2 receive antennas for most channels (PA3, PB3 and VA3).

For phase adaptation the Kalman filter approach and the direction discovery algorithm show the same performance gain for low speed, however for high speed the Kalman filter approach has a better behaviour with a relative gain of around 0.5 dB for VA120.

The invention claimed is:

1. A method of transmitting from a transmitter to a receiver over a channel using a transmit diversity scheme whereby data transmitted from one of multiple transmit antennas of the transmitter is the same as data transmitted from others of the multiple transmit antennas, the same data being transmitted with different relative weightings, the method comprising:

for each of a plurality of time intervals, receiving power-related information fed back from the receiver to the transmitter, relating to a combined power from the multiple antennas as received at the receiver over said channel, wherein the power-related information is fed back for a primary purpose other than transmit diversity to control a function of the transmitter relating to the primary purpose, the primary purpose comprises at least one of: controlling the combined power of the channel, and adaptive modulation;

at the transmitter, applying a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; and using the generated channel state information to control the relative weightings for subsequent transmission to the receiver from the multiple transmit antennas of the transmitter.

2. The method of claim 1, wherein the application of said filter comprises applying a Kalman filter algorithm.

3. The method according to claim 1, wherein said generation is performed without receiving explicit channel state information fed back from the receiver indicating the receiver's preferred weightings, by instead using said power-related information to generate said channel state information at the transmitter.

4. The method according to claim 1, wherein the power-related information comprises a measure of received signal power relative to disturbance.

5. The method according to claim 4, wherein said measure comprises a ratio of signal power to interference-plus-noise.

6. The method according to claim 4, wherein said measure comprises a channel quality indicator.

7. The method according to claim 4, wherein said measure comprises at least one of an SNR and a CQI of a 3 GPP standard.

8. The method according to claim 1, wherein the power-related information comprises a power control command.

9. The method according to claim 8, wherein the power control command comprises a TPC command of a 3GPP standard.

10. The method of claim 8, wherein said refinement of the estimated channel state information for the current time interval is performed using a measurement based on: the power control command for the current time interval, and a step value by which the combined power from the transmitter is raised or lowered in response to a power control command.

11. The method according to claim 1, wherein the power-related information comprises an acknowledgment message or non-acknowledgment message relating to previous transmitted data.

12. The method according to claim 11, comprising applying a different degree of relative bias to one of the acknowledgment and non-acknowledgement before use in said recursive filter.

13. The method according to claim 12, comprising dynamically adjusting said degree of relative bias to maximise a long term performance metric.

14. The method according to claim 1, wherein the different relative weightings define at least different relative phases, and said use of the generated channel state information to control the relative weightings comprises controlling the relative phases.

15. The method according to claim 1, wherein the different relative weightings define different amplitudes, and said use of the generated channel state information to control the relative weightings comprises controlling the relative amplitudes.

16. The method according to claim 1, wherein the method further comprises using the power-related information to determine a reliability measure for the generated channel state information, and also using the reliability measure to control the weightings for a subsequent transmission to the receiver from the multiple transmit antennas of the transmitter.

17. The method according to claim 1, wherein said use of the channel state information to control the weightings comprises updating said weightings at a rate of once per period, wherein said period spans a plurality of said time intervals, and said refinement is performed by combining the power-related information received over some or all of the time intervals spanned by said period.

18. The method of claim 17, comprising dynamically adjusting said period in order to maximise a long term performance metric.

19. The method according to claim 13, wherein the long-term performance metric comprises at least one of: average power saving and average link capacity.

20. The method according to claim 1, comprising regularising said weightings so as to ensure at least a minimum degree of diversity of directions in transmission to the receiver.

21. The method according to claim 1, comprising operating the transmitter in at least two different modes of operation at different times:
 a first mode of operation in which the same data is transmitted from multiple transmit antennas of the transmitter with different relative weightings; and
 a second mode of operation in which data is transmitted from only a selected one or more of the multiple transmit antennas, by applying a non-zero weighting to only the selected one or more transmit antennas;
 wherein in both modes, the weightings are controlled using the generated channel state information.

22. The method of claim 21, wherein in the second mode of operation the data is transmitted from only a selected one of the multiple transmit antennas.

23. The method of claim 1, wherein said refinement of the estimated channel state information for the current time interval is performed using a combined measurement based on the power-related information over a period spanning multiple time intervals.

24. The method of claim 23, wherein the combined measurement comprises an average measurement based on the power-related information for the multiple time intervals.

25. A transmitter comprising:
 multiple transmit antennas;
 transmission circuitry coupled to the multiple transmit antennas, arranged to transmit to a receiver over a channel using a transmit diversity scheme whereby data transmitted from one of the multiple transmit antennas is the same as data transmitted from others of the multiple transmit antennas, the same data being transmitted with different relative weightings;
 reception circuitry arranged to receive, for each of a plurality of time intervals, power-related information fed back from the receiver to the transmitter, relating to a combined power from the multiple antennas as received at the receiver over said channel, wherein the power-related information is fed back for a primary purpose other than transmit diversity to control a function of the transmitter relating to the primary purpose, the primary purpose comprises at least one of:
  controlling the combined power of the channel, and
  adaptive modulation; and
 signal processing apparatus coupled to the transmission and reception circuitry, and configured to apply a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval;
 wherein the signal processing apparatus is configured to use the generated channel state information to control the relative weightings for subsequent transmission to the receiver from the multiple transmit antennas of the transmitter.

26. The transmitter according to claim 25, wherein the signal processing apparatus is configured a Kalman filter as the recursive filter.

27. A program product for transmitting from a transmitter to a receiver over a channel using a transmit diversity scheme whereby data transmitted from one of multiple transmit antennas of the transmitter is the same as data transmitted from others of the multiple transmit antennas, the same data being transmitted with different relative weightings, the program product comprising code embodied on a non-transitory computer-readable medium and configured so as when executed on a processor to:
 for each of a plurality of time intervals, receive power-related information fed back from the receiver to the transmitter, relating to a combined power from the multiple antennas as received at the receiver over said channel, wherein the power-related information is fed back for a primary purpose other than transmit diversity to control a function of the transmitter relating to the primary purpose, the primary purpose comprises at least one of:
  controlling the combined power of the channel, and
  adaptive modulation;
 at the transmitter, apply a recursive filter to generate channel state information relating to the transmit diversity of the channel for each of said plurality of time intervals, wherein the application of the recursive filter comprises estimating the channel state information for a current time interval based on the estimated channel state information from a previous time interval, and refining the estimated channel state information for the current time interval using the power-related information for the current time interval; and
 use the generated channel state information to control the relative weightings for subsequent transmission to the receiver from the multiple transmit antennas of the transmitter.

28. The program product of claim 27, wherein the recursive filter is a Kalman filter.

29. A method of transmitting from a transmitter to a receiver over a channel using a transmit diversity scheme whereby data can be transmitted from a selected one or more of multiple transmit antennas of the transmitter, the method comprising:
 at the transmitter, for each of a plurality of time intervals, receiving power-related information fed back from the receiver to the transmitter, relating to a power from the one or more selected transmit antennas as received at the receiver over said channel, wherein the power-related information is fed back for a primary purpose other than transmit diversity to control a function of the transmitter relating to the primary purpose, the primary purpose comprises at least one of:
controlling the combined power of the channel, and adaptive modulation;
at the transmitter, applying a recursive filter to generate channel state information relating to the transmit-diversity of the channel for each of said plurality of time intervals, wherein the application of the recursive filter comprises estimating the channel state information for a current time interval based on the estimated channel state information from a previous time interval, and refining the estimated channel state information for the current time interval using the power related information for the current time interval; and
using the generated channel-related information to select which of the multiple transmit antennas to use for subsequent transmission to the receiver.

30. The method of claim 29, whereby said data is transmitted from only a selected one of the multiple transmit antennas at any one time.

31. The method of claim 29, wherein said power-related information comprises a power control command.

32. The method of claim 31, wherein said refinement of the estimated channel state information for the current time interval is performed using a measurement based on: the power control command for the current time interval, and a step value by which the power from the one or more selected transmit antennas is raised or lowered in response to a power control command.

33. The method of claim 29, wherein said refinement of the estimated channel state information for the current time interval is performed using a combined measurement based on the power-related information over a period spanning multiple time intervals.

34. The method of claim 33, wherein said combined measurement comprises an average measurement based on the power-related information for the multiple time intervals.

35. A transmitter comprising:
multiple transmit antennas;
transmission circuitry coupled to the multiple transmit antennas, arranged to transmit to a receiver over a channel using a transmit diversity scheme whereby data can be transmitted from a selected one or more of the multiple transmit antenna;
reception circuitry arranged to receive for each of a plurality of time intervals power-related information fed back from the receiver to the transmitter, relating to a power from the one or more selected transmit antennas as received at the receiver over said channel, wherein the power-related information is fed back for a primary purpose other than transmit diversity to control a function of the transmitter relating to the primary purpose, the primary purpose comprises at least one of:
controlling the combined power of the channel, and adaptive modulation; and
signal processing apparatus coupled to the transmission and reception circuitry, configured to apply a recursive filter to generate channel state information relating to the transmit-diversity of the channel for each of said plurality of time intervals, wherein the application of the recursive filter comprises estimating the channel state information for a current time interval based on the estimated channel state information from a previous time interval, and refining the estimated channel state information for the current time interval using the power related information for the current time interval;
wherein the signal processing apparatus is further configured to use the generated channel-related information to select which of the multiple transmit antennas to use for subsequent transmission to the receiver.

36. The transmitter according to claim 35, whereby data is transmitted from only a selected one of the multiple transmit antennas at any one time.

37. A program product for transmitting from a transmitter to a receiver over a channel using a transmit diversity scheme whereby data can be transmitted from a selected one or more of multiple transmit antennas of the transmitter, the program product comprising code embodied on a non-transitory computer-readable medium and configured so as when executed on a processor to:
for each of a plurality of time intervals, receive power-related information fed back from the receiver to the transmitter, relating to a power from the one or more selected transmit antennas as received at the receiver over said channel, wherein the power-related information is fed back for a primary purpose other than transmit diversity to control a function of the transmitter relating to the primary purpose, the primary purpose comprises at least one of:
controlling the combined power of the channel, and adaptive modulation;
applying a recursive filter to generate channel state information relating to the transmit-diversity of the channel for each of said plurality of time intervals, wherein the application of the recursive filter comprises estimating the channel state information for a current time interval based on the estimated channel state information from a previous time interval, and refining the estimated channel state information for the current time interval using the power related information for the current time interval; and
use the generated channel-related information to select which of the multiple transmit antennas to use for subsequent transmission to the receiver.

38. The program product of claim 37, whereby data is transmitted from only a selected one of the multiple transmit antennas at any one time.

* * * * *